United States Patent [19]

van der Lely

[11] Patent Number: 4,684,089

[45] Date of Patent: Aug. 4, 1987

[54] COMPUTER WITH UNIVERSAL INPUT MEMBER FOR USE ON STATIONARY AND MOBILE PLATFORMS

[76] Inventor: Cornelis van der Lely, 7 Brüschenrain, Zug, Switzerland

[21] Appl. No.: 790,301

[22] Filed: Oct. 22, 1985

[30] Foreign Application Priority Data

Oct. 22, 1984 [NL] Netherlands ........................ 8403202
Oct. 22, 1984 [NL] Netherlands ........................ 8403201
Dec. 24, 1984 [NL] Netherlands ........................ 8403925
Dec. 24, 1984 [NL] Netherlands ........................ 8403924

[51] Int. Cl.$^4$ ............................................. A47G 29/00
[52] U.S. Cl. ..................... 248/124; 364/190; 364/424; 364/567; 340/709; 340/711; 358/249; 358/255; D14/100; D14/115
[58] Field of Search ............. 248/124, 122; D14/100, D14/102, 106, 107, 114, 115; 364/190, 410, 424, 567, 568; 340/700, 709, 710, 711; 358/190, 248, 249, 254, 255; 220/455, 902

[56] References Cited

U.S. PATENT DOCUMENTS

| | | | |
|---|---|---|---|
| D. 270,446 | 9/1983 | Rudman et al. ................... | D14/106 |
| 2,042,983 | 6/1936 | Fairchild . | |
| 2,804,278 | 8/1957 | Jewett . | |
| 4,009,375 | 2/1977 | White et al. ........................ | 364/424 |
| 4,168,870 | 9/1979 | Hill . | |
| 4,365,561 | 12/1982 | Tellier et al. . | |
| 4,376,298 | 3/1983 | Sokol et al. ......................... | 364/424 |
| 4,382,166 | 5/1983 | Kim ...................................... | 340/709 |
| 4,504,910 | 3/1985 | Araki et al. ......................... | 364/424 |
| 4,518,044 | 5/1985 | Wiegardt et al. ................... | 364/424 |
| 4,532,514 | 7/1985 | Hatano et al. ...................... | 364/424 |
| 4,539,650 | 9/1985 | Griffin et al. ....................... | 364/567 |
| 4,548,079 | 10/1985 | Klatt .................................... | 364/424 |
| 4,561,619 | 12/1985 | Robillard et al. ................... | 248/1 B |
| 4,569,572 | 2/1986 | Kopich ................................ | 358/255 |
| 4,573,124 | 2/1986 | Seiferling ............................ | 364/424 |
| 4,573,581 | 3/1986 | Galloway et al. .................. | 220/902 |
| 4,581,609 | 4/1986 | Hosogoe et al. .................... | 340/710 |

OTHER PUBLICATIONS

IBM Technical Disclosure Bulletin, vol. 22, No. 4 of Sep. 1979 for Adjustable Display.
IBM Technical Disclosure Bulletin, vol. 27, No. 4A of Sep. 1984 for Adjustable Workstation.

Primary Examiner—Richard J. Scanlan, Jr.
Assistant Examiner—Douglas W. Hanson
Attorney, Agent, or Firm—Penrose Lucas Albright

[57] ABSTRACT

A computer which is portable and transportable by a person and which can be used on a table has a universally movable computer input device such as a spherically shaped input member surrounded by sensors which is attached to the computer housing to enable use of the computer/input device combination in further operating conditions such as may occur in association with a vehicle. One or more sensors suitable for mounting on the vehicle and providing operating data involving the vehicle can be connected with computer inputs for continually computing and displaying results of the vehicle's operations during such operations and in the vehicle.

25 Claims, 20 Drawing Figures

COMPUTER WITH UNIVERSAL INPUT MEMBER FOR USE ON STATIONARY AND MOBILE PLATFORMS

SUMMARY OF THE INVENTION

The present invention relates to a computer, portable and transportable by a person and provided with at least one housing constructed so that the computer can be used while supports on a table.

Known computers are provided with control devices movable relative to the computer housing (such as a "mouse"), which control devices are controllable by being moved over a table. The application is tied to a table and therefore of limited use. Such a control device prevents an efficient application of the computer at other locations, for example in vehicles. The object of the invention is to prevent these disadvantages. This is achieved according to the invention in that a universally movable input device, such as a spherically shaped input member, is attached to the computer housing.

In this manner it is possible, e.g., to make use of a control device even with a computer installed in a vehicle, the use of the device not being dependent on the presence of a flat surface. The center of the sphere of the control device, surrounded by sensors and attached to a lever, is attached to the housing.

BRIEF DESCRIPTION OF THE DRAWINGS

The invention will now be described with reference to the drawings listed below.

DESCRIPTION OF THE PREFERRED EMBODIMENTS

The invention is based on known computer types provided with a keyboard for entering a program and data, a screen and possibly a printer coupled with the computer for recording its data output; if present, such a printer is regarded as part of the computer. In addition to these known computers other designs are known where another input device is present besides the keyboard for switching on certain programs or program parts and for entering data, this device being connected with the remaining part of the computer mostly by means of a junction cable. Such a separate manually operated input device is known as a "mouse" and is used, e.g., under the trade name Apple Mackintosh, but the invention is not restricted to this system and can also be applied on the basis of other brands on the market.

Figure 1:
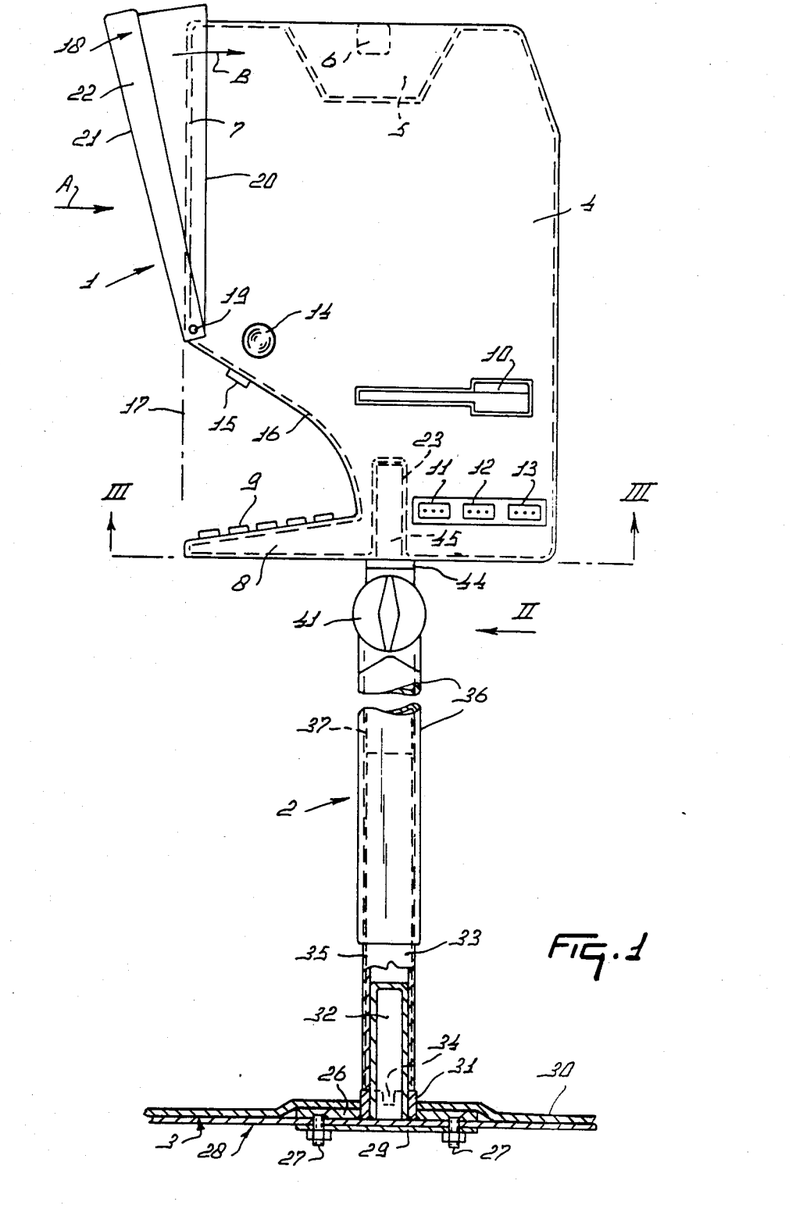
FIG. 1 is a said view of a computer, mounted on a support according to the invention.

FIG. 1 shows a side view of a computer 1, mounted on a support 2 which is fastened to the floor or the bottom plate of a vehicle such as an agricultural tractor, car, truck, vessel, airplane or similar mobile unit. The computer 1, which may in principle be in the form of a parallelepiped, is enclosed in a housing 4 with a recess 5 in its top surface, bridged by a handle 6 by means of which the computer 1 can be easily carried. The computer housing 4 is about twenty-five centimeters in width, about twenty-five centimeters in length and about thirty-five centimeters in height; the weight of the computer 1 is about ten kilograms.

The housing 4 encloses a screen 7 and a control unit 8 provided with a keyboard 9 for entering programs and/or data. There is an input opening 10 at one side of the housing 4 for the insertion of cassettes such as cassettes with data and/or programs stored therein. Three connectors are placed next to each other on the same side of the computer for coupling it to an electric power supply—one connector 11 designed for connection to a 220 V A.C. supply, one connector 12 for connection to a 110 V A.C. supply and one connector 13 for connection to a 12 V or 24 V D.C. supply. The 12 V connection is intended in particular for feeding the computer from an automotive storage battery when it is placed in a vehicle, such as an agricultural tractor, a car or the like.

The circuits present in the computer are presumed to correspond the those of the known personal computers, for which many programs are obtainable.

A part of a universally movable spherical input device 14, provided with triggering means and having a function corresponding to that of the aforementioned "mouse" protrudes from an opening, recessed in the side wall of the housing 4 visible in FIG. 1. A push-button 15 situated near the sphere 14 has a function corresponding to that of the push-button, attached in known computers likewise to the "mouse". The movements and the position of the sphere 14 can be entered in the computer system by means of sensors placed near the sphere. The push-button 15 is mounted in a boundary surface or wall portion 16 of the housing 4 which, regarded in the viewing direction A starting from the lower edge of the screen 7 (which extends approximately to the top of the housing 4) is directed over the whole width of the housing 4 slantingly downward and forward and terminates near the back of the fixed keyboard 9. The keyboard 9, starting from this lower edge of the surface 16 which, viewed from the side, is preferably curved downward to provide sufficient space for a hand controlling of the keyboard, is inclined rearward and terminates near to or, relative to the direction A (FIG. 1) which points to and is normal to the screen, behind a plane 17 which comprises the front of the screen 7. Viewed in the direction A, the keyboard 9 and the control device 8 thus lies entirely or nearly entirely behind the face of the screen, so that the computer does not have any protruding parts. Portability is thereby improved and the chance of damaging the computer during transport reduced. The location of the sphere 14 (by means of which, in combination with the push-button 15, certain programs stored in the computer can be indicated on the screen and activated, and drawings and diagrams displayed on the screen) is such that it can be controlled by the forefinger of a user in front of the computer, while the thumb of the same hand can control the push-button 15 situated near the sphere for recording the functions or drawings indicated by means of the sphere 14.

An adjustable cap 18, U-shaped as viewed in the direction A, is mounted near the screen 7 and extends at least in part along the outer sides and the edges lying near the screen 7 of the lateral sides and top of the housing 4. The cap 18 swivels by means of two hinges about a horizontal axis directed normal to the direction A, a hinge 19 being provided for this purpose on each side and near the front of the housing 4. The swivel axis defined by the hinges 19 lies near the lower side of the screen 7. As viewed from the side (FIG. 1), the shield 18 is in the main triangular in form. The swivel axis of hinges 19 is situated near the downward pointing tip of this triangle; the rear (as viewed in the direction A) boundary line 20 of the cap 18, shown in FIG. 1 in the swung-out position, is parallel to the screen 7, whereas the front boundary line 21 points slantingly upward and, viewed in the direction A, rearward. The cap 18 is mounted along the boundary line 21 with a buffer edge 22. The cap 18 can be swung about the hinges 19 in the direction B from its operating position shown in FIG. 1 to a position wherein the boundary line 21 lies parallel to the screen 7; this position is intended for transportation. whereas the position shown in FIG. 1 is intended to facilitate reading from the screen, in particular when the angle of incidence of the light, e.g. on a field, is such that it disturbs the observation of the screen. The cap 18 can be swung manually about the hinges 19; the friction in the hinges is sufficient to prevent the cap from being displaced in an undesirable manner by shocks.

Figures 2, 3, 4:
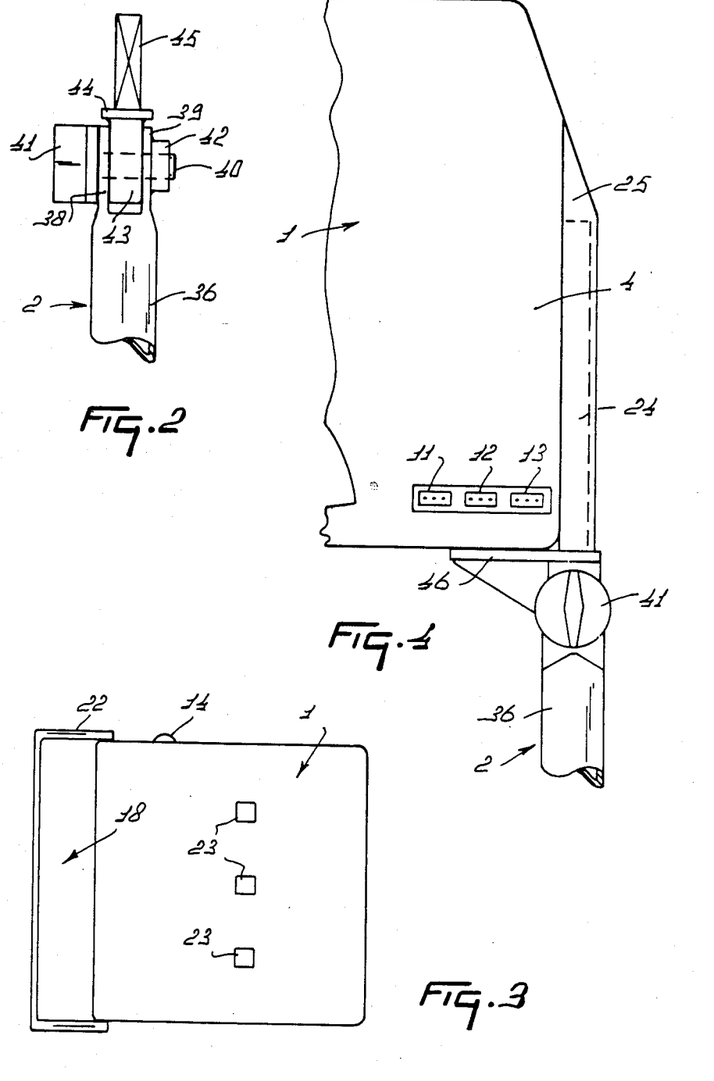
FIG. 2 is a view taken in the direction of arrow II in FIG. 1.
FIG. 3 is a bottom view of the computer along line III—III in FIG. 1.
FIG. 4 is a side view of an alternative possiblity of attaching the support according to FIG. 1 to the computer.

As shown in FIGS. 1 and 3, at least two—but in this embodiment three—upwardly directed tubular recesses 23 are provided in the base of the housing 4. Viewed in a section parallel to the base, the recesses have the same polygonal—in this embodiment quadratic—cross section. The center lines of the receses 23 lie in a common plane normal to the direction A; the distances between the recesses 23 and the distances between the outermost recesses and the side walls of the housing 4 are approximately equal. The center of gravity of the computer 1 lies approximately in the plane passing through the center lines of the recesses 23. The recesses 23 are bounded by infoldings of the wall of the housing 4. The depth of each of the recesses 23 is from about five to eight centimeters. FIG. 4 shows an alternative arrangement of the recesses; these are in the form of recesses 24 in vertical ribs 25, the material of which is integral with the material of the housing 4. The recesses 24 are also polygonal—in this case quadratic—in cross section, but the depth of the recesses 24 can be considerably greater than that of the recesses 23, in this case from about twenty to twenty three centimeters. In the embodiment according to FIG. 4, there are likewise three recesses 24 one next to the other and these are also uniformly distributed over the width of the housing 4.

The computer 1 is supplemented with a support 2 which, through detachable from it, can be regarded as in essence belonging to the computer as the support considerably extends its fields of application.

The support 2 comprises a base plate 26 (FIG. 1) which, in top view, can be quadratic or polygonal in outline and is detachably fastened to a floor plate 28 by three bolts 27. The floor plate 28 can be the floor plate of a vehicle, such as a car, an agricultural tractor, a truck or the like for applications to be explained later in detail. A reinforcing plate 29 provided at the base of the floor plate 28 is clamped by the bolts 27 together with the base plate 26 against the floor plate 28. The base plate 26 is covered by the floor-covering 30 of the vehicle. In the middle of the base plate 26 there is a hole in which a tube 31 is placed, connected with the base plate by welds around its periphery. The center line of the cylindrical tube 31 points upward, e.g., normal to the floor plate 28. The height of the tube 31 is preferably such that it hardly protrudes above the floor covering 30. The tube 31 encloses a cylindrical pipe 32, sealed on top slightly spherically to facilitate the installation of a remaining part of the support to be still described, but which can be open at its base. The center lines of the tube 31 and the pipe 32 coincide. The parts 26, 31 and 32 form a holder which can be fixed in the vehicle.

The pipe 32 pointing upward is welded at its base to the base of the tube 31, but it can in principle also be placed loosely in the tube 31. The pipe 32 is from about five to fifteen centimeters in total length and protrudes over most of its length above the top of the tube 31. The pipe serves to center and laterally brace a pipe 33, which pertains to the support 2, the center line of which coincides with the practically vertical center lines of the tube 31 and the pipe 32. The pipe 32 is tightly enclosed by the pipe 33 which, when installed, rests with its base on the upper surface of the wall of the tune 31. However, the pipe 33 can easily be slipped off the pipe 32 in the upward direction. The pipe 33 can be provided at its base with a boss 34 protruding downward into a recess in the top of the wall of tube 31; the boss 34 prevents the pipe 33 from turning relative to the tube 31. The total length of the pipe 33 is from about sixty to seventy centimeters. The pipe 33 is provided on its periphery over its whole length with a screw-thread 35 and is enclosed, at least over a part of its length, in a pipe 36, provided with an internal screw-thread 37 which fits the screw-thread of pipe 33. The top of pipe 36 protrudes in general above the top of pipe 33. Owing to the presence of the screw-threads 35 and 37, pipe 36 is axially displaced relative to pipe 33 when the former is rotated about its center line.

The pipe 36 is fitted at its upper end with two parallel lugs 38 and 39 spaced one from the other (FIG. 2) and each provided with a hole so that the holes are in line. A clamp in the form of a threaded bolt 40, passed through these holes, is fitted with a locking knob 41 in the form of a wing nut. The screw-thread on the bolt 40 fits the screw- thread in a projection 42 fixed on the lug 39 so the the lugs 38 and 39 are bent toward each other when the locking knob 41 is tightened. The bolt 40 passes through a hole in a clamp block 43 of rectangular cross section, placed between the lugs 38 and 39. The clamp block 43 is provided at its top, in a place above the tops of the lugs 38 and 39, with a supporting face in the form of a collar 44, designed to support the weight of the computer 1. A peg-shaped prop 45, polygonal—in this embodiment quadratic—in cross section, is arranged on the top of the collar. The prop 45 is an extension of the clamp block 43 and forms with the collar 44 a top portion of the support of one piece of material. The prop 45 extends freely upward. The clamping means 40, 41 forms a lockable hinge having an approximately horizontal center line which crosses the direction A at right angles. The prop 45 is dimensioned and configured as to fit closely one of the recesses 23 shown in FIG. 3 or —in the alternative embodiment of FIG. 4—one of the recesses 24. The length of the prop 45 is in the latter case considerably greater than in the case of the recesses shown in FIG. 3 (and likewise shown in FIG. 1).

The computer can be slid, as desired, with one of the recesses 23 over the prop 45, so that it can be placed without any assembly work in the spot most favorable from the view-point of the user. The same applies to the embodiment according to FIG. 4, but the contact face between the prop and the corresponding rib 25 is here larger to shore up the weight of the computer. The depth of the recesses 23 and 24 respectively is such that the prop 45 placed in them is slightly shorter than the length of the recess, so that the weight of the computer rests on the supporting face of the collar 44, or on a supporting face 46 (FIG. 4), for this embodiment mounted on and forming part of the clamp block 43.

With the aid of the support 2 described above, a computer 1 installed in a vehicle can then be easily adapted to the restricted space available and to the location of its user. If the computer is installed in a car, in front of the rear seats or in front of the front seats, the eye height of the user with respect to the floor of the vehicle is relatively small. To ensure that the center of the screen 7 lies at about eye height, the pipes 36 and 33 which are rotatable one relative to the other are turned with respect to one another until the computer arrives at the desired eye height owing to the axial displacement of these pipes. If the clamping means 40, 41 are loosened, the direction in which the prop 45 protrudes relative to the direction of the pipes 33 and 36 can be adjusted so that the computer is tilted forward or backward relative to the floor 28 to adapt it to the wishes of the user. As already mentioned, the computer can be moved sideways relative to the support 2 and relative to the user by selecting the appropriate one of the holes 23 and 24 for the insertion of the prop 45. The computer mounted with the support is installed without assembly work.

If the computer is installed in an agricultural tractor where the distance between the eyes of the driver/user and the floor is usually greater than in a car, the support 2 can be extended by moving the pipe 36 upward relative to the pipe 33 by turning these pipes one with respect to the other. The pipes 33 and 36 are dimensioned preferably so that the center of the screen 7 can be adjusted to distances of from one hundred to one hundred sixty centimeters above the floor.

Figure 5:
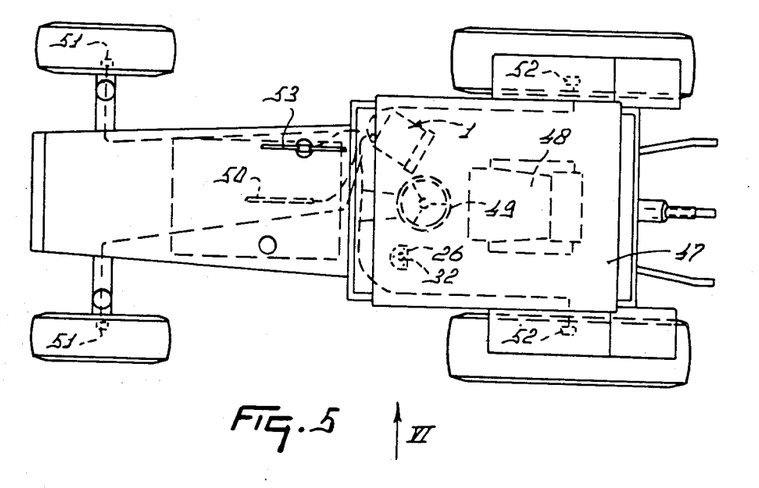
FIG. 5 is a top view of an agricultural tractor fitted with a computer according to the invention.
Figure 6:
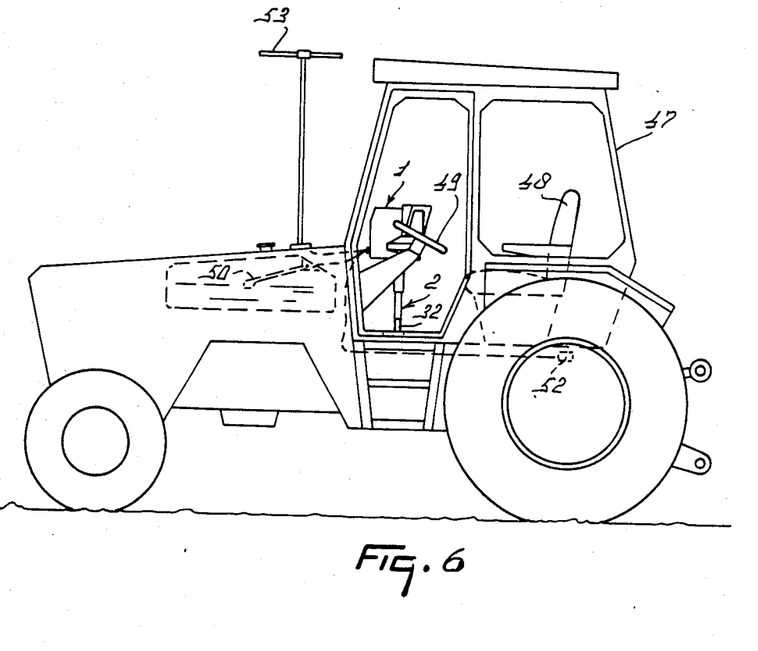
FIG. 6 is a side view of the tractor according to FIG. 5.

FIGS. 5 and 6 represent two views of the units 1, 2 (computer and support) installed for use in an agricultural tractor. Provision is made in such a case for two possible arrangements, the choice depending on the preference of the user/tractor driver which, in its turn, can depend among other factors on the direction of the incident light. In a driver's cab 47, with a driver's seat 48 and a steering device 49, the base plate 26—mounted with the pipe 31 and possibly the pipe 32 (FIG. 1)—is screwed to the floor plate 28 of the tractor cab at both sides of the steering device 49. In this embodiment, the base plate 26 is used to the right of the steering device 49 and the computer is installed by sliding the pipe 33 of the support 2 simply over the pipe 32, adjusting it to the desired height by turning the pipes 33 and 36 one with respect to the other and then placing the computer 1 on the prop 45. The screen can then be adjusted more accurately by means of the clamping means 40, 41.

The agricultural tractor constitutes a relatively important part of the conduct of the business and operations of plowland farming and forms a considerable expense item. It is mainly for these reasons that an optimization is aimed at of the work to be performed by the tractor (e.g. the number of hectars plowed per hour). The tractor is therefore provided according to FIGS. 5 and 6 with sensors 50, 51 and 52 for receiving data designed to determine the fuel consumption per unit time, the distance covered per unit time or the slip of the driven wheels—data which are worked out in a processing unit included for this purpose in the computer. These data are stored in the memory and made available eventually by means of a printer. The tractor is also fitted with an aerial 53 for television reception, so that the driver can take note on his screen 7 of weather reports, teletext data and the like.

Figure 7:
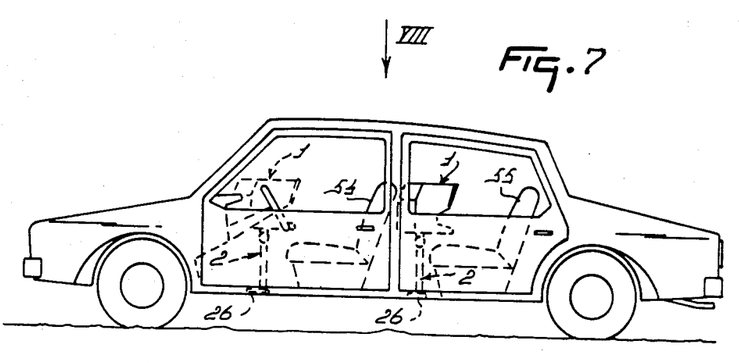
FIG. 7 is a side view of a car fitted with one or more supports for a computer according to the invention.
Figure 8:
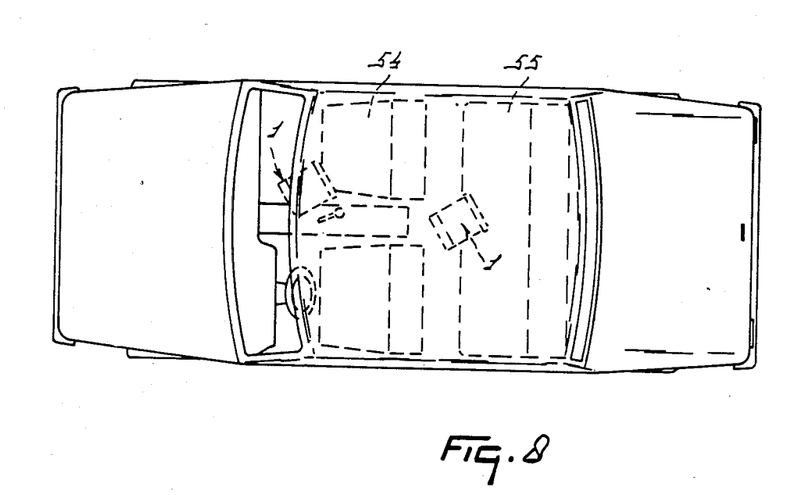
FIG. 8 is a top view in the direction of arrow VIII in FIG. 7.
Figure 9:
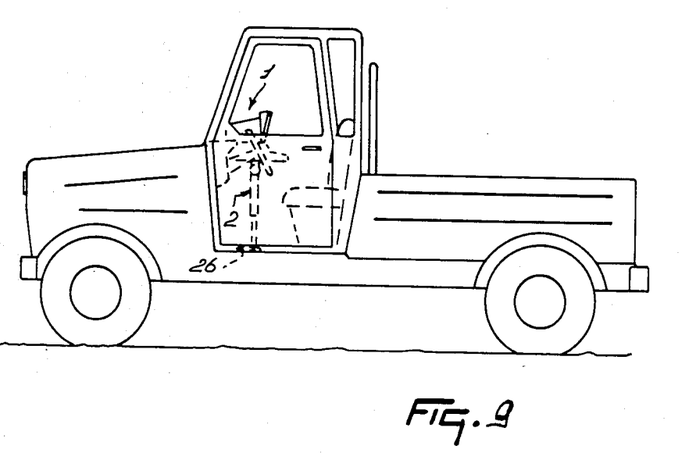
FIG. 9 is a side view of a truck fitted with a computer mounted next to the driver's seat.

The car illustrated in FIGS. 7 and 8 is similarly mounted with at least one base plate 26, fastened to the floor plate of the vehicle. In the embodimenttn shown, a first base plate 26 is attached to the floor near a front seat 54 placed next to the driver's seat, a second base plate 26 being fixed on the floor of the car near the vertical plane of longitudinal symmetry of the vehicle directly in front of a rear seat 55. The computer 1 provided with the support 2 can therefore be placed as desired in a simple and reliable manner on an appropriately selected pipe 32 without any installation work and can be removed just as simply. This application is of importance for entering and processing data during business trips and field measurements (e.g. by land surveyors, supervisors and inspectors of outdoor work, such as performed by the building industry), the recording of the number of man-hours worked and the like. The installation of a unit of computer 1 and support 2 in a truck, such as disclosed in FIG. 9, finds a similar application, the unit being mounted in front of the seat situated next to the driver's seat. With this application it is possible to consider the recording of delivery times, type of delivery, amounts delivered, time spent in driving, but also of data resulting from surveying the graphic working out of such results, and the like.

After the return of the vehicle the computer 1, with or without the support 2, can be removed from the vehicle by means of the handle 6 and can be placed in the home or at the office on a table, whereupon further processing can be performed. A printer can be connected here to the computer to record the desired data on paper, but the computer 1 as such can also be provided with a printer.

Figure 10:
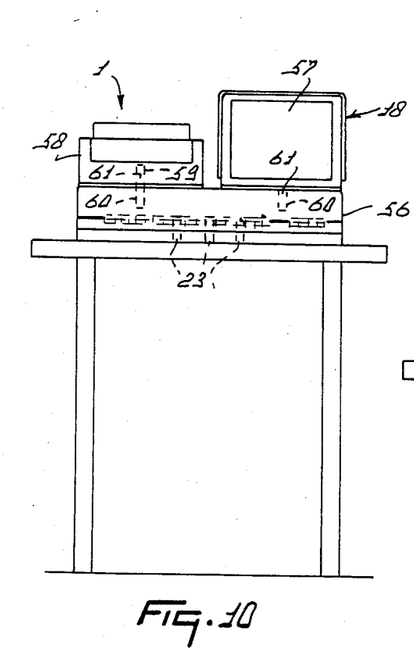
FIG. 10 is a front view of a computer placed on a table and consisting of three detachable parts which, however, can be attached one to the other.
Figure 11:
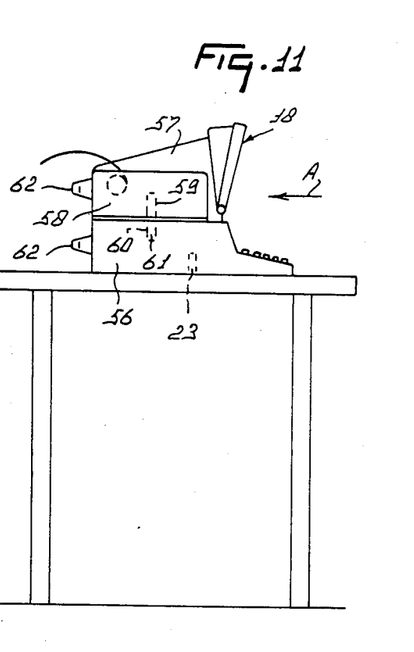
FIG. 11 is a side view of the disposition according to FIG. 10.

The invention also extends to a unit of computer 1 and support 2 where the computer 1 is made up of various main parts which can be separated from each other and where the computer comprises a printer. Such an arrangement is illustrated in FIGS. 10 and 11, where the computer 1 comprises a keyboard housing 56 with the major portion of the electronic circuit, a screen housing 57 and a printer 58. As appears from FIG. 10, the width—as viewed in the direction A (FIG. 11)—of the housing 56 which comprises the keyboard is the greatest so that the screen 57 and the printer 58 can be placed preferably one next to the other on the upper surface of the housing 56 without protruding on either side beyond this housing. The screen housing 57 and the printer 58 are detachably mounted on the housing 56. The base of the screen housing 57 and that of the printer housing 58 are for this purpose mounted with a recess 59 having the same cross-sectional dimensions as two recesses 60 provided in the top of the housing 56. The two recesses 60 in the top of the housing 56 are spaced one from the other (FIG. 10), one of the recesses 60 lying in the working condition in the continuation of the recess 59 of the printer 58 and the other recess 60 in the continuation of the recess 59 in the screen housing 57. The recesses 59 and 60 are polygonal—e.g., octagonal—in cross-section. To interconnect the three main parts so that they cannot be shifted sideways, a closely fitting peg 61 of polygonal (e.g., octagonal) cross-sectional is inserted in each of the two recesses 60 in the housing 56. These pegs protrude above the upper surface of the housing 56 to such an extent that they fill the recess 59 in the printer 58 and the recess 59 in the screen housing 57 to nearly their entire depth. The screen 57 and the printer 58 can therefore be optionally mounted, relative to the center line of the corresponding peg 61, in angularly different positions with respect to the housing 56 and can be removed only by lifting.

In the base of the housing 56 or next to its back wall, recesses are provided analogous to the recesses 23 and 24 shown in the FIGS. 3 and 4 respectively. Handles 62, integral with the material of the corresponding housing, are provided on the back sides of each of the housings 56, 57 and 58 so that each of the three main parts of the computer 1 can be carried separately. If the computer 1 shown in FIGS. 10 and 11 installed on a table (e.g., in an office) is to be placed in a vehicle, the screen 57 and the printer 58 are removed from the housing 56 by simply lifting them off the latter, each of the pegs 61 sliding out of the recesses 59 in the parts 57 and 58. The support 2 is then slid over the pipe 32 of the holder in the vehicle and the housing 56 is placed on the prop 45 of the support 2, making use of one of the recesses 23 or 24. The screen 57 is then placed in the described position. laterally immovably, on the housing 56 by means of the peg 61 protruding from the top of the latter and inserted in the recess 59 in the housing 57; the housing 58 of the printer is handled analogously. The combination of the computer parts shown in FIGS. 10 and 11 can thus be used in each of the applications described above. The holders 26, 31 and 32 mounted in the vehicle do not restrict (without the computer mounted on them) the sitting or floor space.

The computer 1 is in general a normal personal computer for which many standard programs are available, but the invention is also applicable to computers designed for special purposes.

The possibilities of application of a computer can in this manner be considerably extended as the known computers can be used in essence only on a table in a stationary working environment (home or office) and all the facilities offered by the computer, such as the editing of texts, the compilation of overviews (e.g., with the aid of tables derived from the computer), the production of statistical data and the composition of drawings are tied to this stationary placement. Data collected elsewhere must be broght to the computer and data produced by the computer must be conveyed to the place where the results are applicable; the loss of time involved results in extra costs. The application of the computer can now be considerably extended in accordance with the invention if this is applied in vehicles such as agricultural tractors, cars and trucks so that data obtained in the field can be directly entered in the computer without loss of time, while the computer results originating therefrom and possibly obtained in combination with data previously entered are likewise directly available and can be utilized. This applies in particular to the use by the driver of an agricultural tractor during his work on the field, but also to applications for surveyors, supervisors and inspectors of outdoor work when the computer is installed next to a seat in a car or truck so that it is possible not only to operate the input devices, such as a keyboard, but also to make use of a screen and a printer in a mobile arrangement without being tied to an office space or the like.

The addition of a support and the adaption of the computer housing to this support results in a simple manner in the considerable enlargement of the number of places where the computer can be used and in the exclusion of loss of time and unnecessary man-hours.

Figures 12, 13:
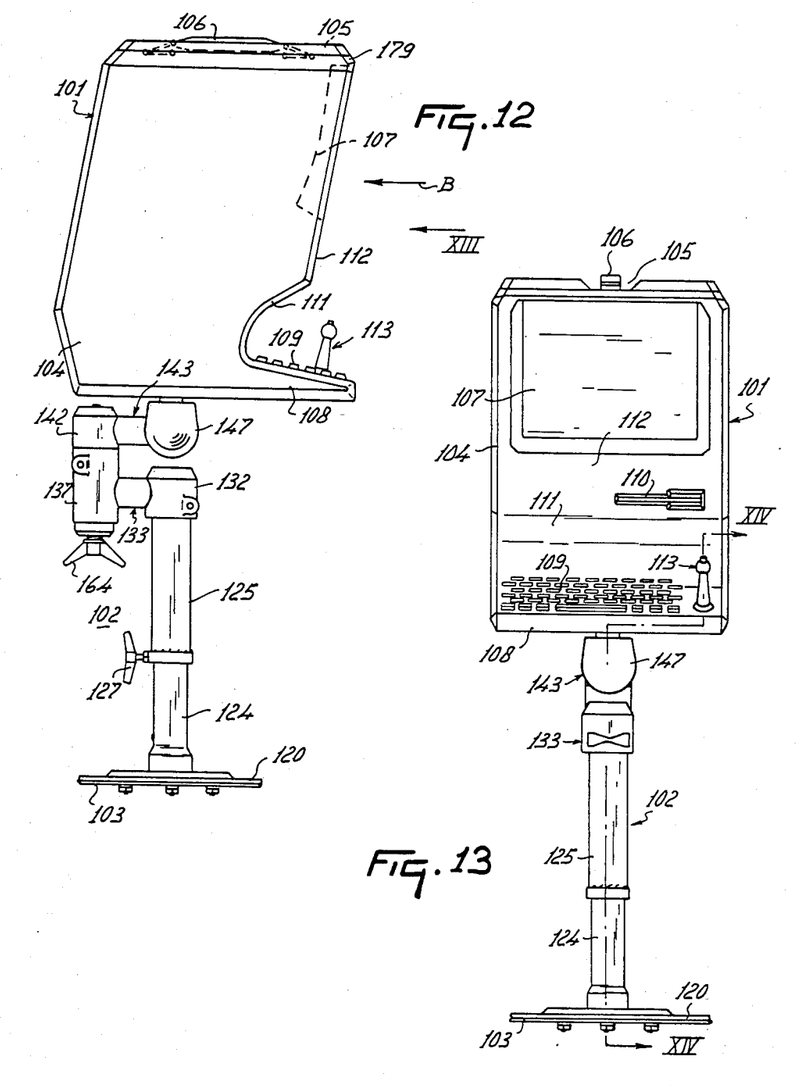
FIG. 12 is a side view of a computer mounted in a vehicle according to a following embodiment.
FIG. 13 is a view taken in the direction of arrow XIII in FIG. 12.

In FIG. 12 an embodiment is shown in side view of a computer 101 which as a whole rests on a support 102 attached to the floor or bottom plate 103 of a vehicle, such as an agricultural tractor, a car, a truck, vessels, airplanes or similar mobile units. The computer 101 has a housing 104 substantially in the shape of a parallelepiped and provided on its upper surface with a recess 105 bridged by a handle 106 by means of which the computer 101 can be easily carried and displaced. In the case of this embodiment the housing 104 is again about twenty-five centimeters in width, about twenty-five centimeters in length and about thirty-five centimeters in height, the weight of the computer 101 being approximately ten kilograms.

The housing 104 encloses the edges of a screen 107 and a control device 108 for entering programs and/or data, provided for this purpose with a keyboard 109. At one side of the housing 104 there is an input opening 110 for the insertion of cassettes such as diskettes with data and/or programs stored therein. The computer 101 can in this embodiment be likewise fed preferably by three alternative power supplies; there is a connector for 220 V A.C., a connector for 110 V A.C. and a connector for 12 V or 24 V D.C. The latter connector is designed in particular for the supply of the computer from an automotive storage battery while it is installed in a vehicle, such as an agricultural tractor, a car or the like.

The circuits present in the computer are presumed to correspond to those of the known personal computers for which many programs are obtainable.

The front of the computer is occupied near its upper surface to a considerable extent by the screen 107. The front continues from the lower edge of the screen in the form of a boundary surface or wall portion 111 of the housing 104. Regarded in the viewing direction B (FIG. 12), the wall portion 111 starting from the lower edge of the screen 107 is directed over the whole width of the housing 104 slantingly downward and forward and terminates near the back of the fixed keyboard 109. Starting from the lower edge of the surface 111 which, viewed from the side, is preferably curved downward to provide sufficient space for a hand controlling the keyboard 109, the keyboard continues rearward and terminates near to or, relative to the direction B, just behind a plane 112 which comprises the front of the screen 107.

Viewed in the direction B, the keyboard 109 and the control unit 108 thus lie in this embodiment likewise entirely or nearly entirely behind the upper edge of the screen, so that the computer does not have any protruding parts. Portability is thereby improved and the chance of damaging the computer during transport reduced.

A control member 113, which has a function analogous to that of the afore-mentioned control unit 108, is placed next to the keyboard 109. By means of this control member 113 it is possible to indicate, by an arrow displayed on the screen 107, computer programs or functions, but with the aid of this input device it is also possible to display drawings or figures on the screen 107. This indication of programs or functions and the display of figures on the screen is effected by rotating a sphere 114, provided with triggering means, about its center. The sphere can be swivelled in all directions and is surrounded over a large part of its surface by sensors (FIG. 14) which register the movements of the sphere; this registration can be stored subsequently in the computer memory. The sensors 115 and the greater part of the sphere are inside the computer housing. The sphere 114 is mounted with a lever 116 rigidly connected with the sphere and pointing upward. The lever is mounted on its top with a push-button 117. In case the sphere 114 was moved about its center by means of the lever 116 and this movement was displayed on the screen, and if thereby a program or function indicated on the screen was pointed out, this choice can be stored in the computer memory by depressing the push-button 117. This also applies to drawings produced on the screen 107 by the rotation of the sphere.

Since the input member 113 is mounted as a whole fixedly with respect to the housing 104 and is nevertheless provided with the possibility of moving the sphere in the desired manner about its center, the user is not tied to the presence of a flat surface such as the top of a table the roll the sphere over it. Owing to the firm placement of the input member 113 as a whole, the user is not disturbed during its operation by accelerations which could unfavorably affect the movement of the sphere in case the computer is installed by means of the support 102 in a moving vehicle. The manually effected movements of the lever 116, transferred to the sphere 114, can be performed without disturbance if the user lets another part of his hand rest on the edge of the keyboard or of the housing 104.

Figure 14:
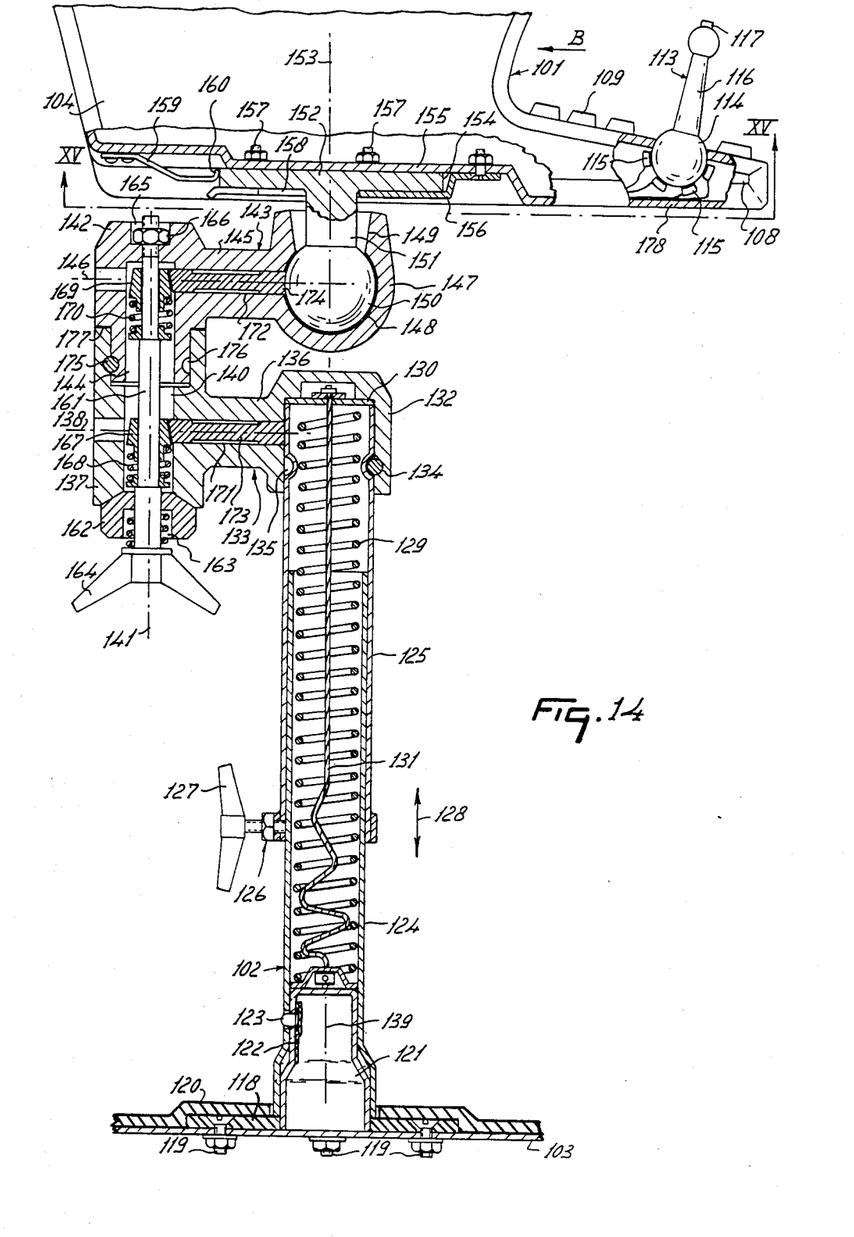
FIG. 14 is a cross-section along line XIV—XIV in FIG. 13.

The design of the support 102 is shown in detail in FIG. 14. The support 102 comprises a base plate 118 which, in plan view, is rectangular or polygonal in contour and in this embodiment is fastened detachably to the floor plate 103 by means of a number of bolts 119. The floor plate 103 can be the floor plate of a vehicle, such as a car, an agricultural tractor, a truck or the like for applications to be later explained in detail. The base plate 118 is covered by the floor-covering 120 of the vehicle. In the center of the base plate 118 there is a hole in which a tube 121 is placed, connected with the base plate 118 by means of welds around its circumference. The center line of the pipe 121 points upward, preferably normal to the floor plate 103. The tube 121 protrudes preferably only a little above the floor covering 120. A small plate 122 of spring steel, placed against the inside of the tube 121 in the space enclosed by the latter, is attached near its bottom to the inner wall of the tube 121, e.g. by point welding, and is directed upward from this point of attachment. The plate 122 rests near its upper end against the collar of a locking button 123 which protrudes outside the tube 121 through an opening in the wall of the latter.

The tube 121 is enclosed in the assembled state by a supporting pipe 124, the bottom of which extends to the top of the base plate 118. The center line of the supporting pipe 124 is preferably normal to the floor plate 103. In the supporting pipe 124 an opening is provided at the height of the locking button 123 through which the latter can protrude. When the supporting pipe 124 is slipped over the tube 121 and pushed downward, its bottom will push the locking button 123 inward against the spring tension of the plate 122; when the bottom of the supporting pipe 124 reaches the base plate 118, the opening in the supporting pipe 124 will have just arrived at the height of the locking button 123 so that the latter can, under the effect of the spring tension of the plate 122, pass outward through the opening in the supporting pipe 124 and the latter will be secured against the both axial displacement and rotation relative to the tube 121. The total length of the supporting pipe 124 is from about sixty to seventy centimeters.

The upper portion of the supporting pipe 124 is tightly enclosed by a carrying pipe 125 which can be shifted axially relative to the supporting pipe 124. The center lines of the two cylindrical pipes 124 and 125 coincide. A clamping means 126, mounted with a manually operated wing nut 127, is provided near the bottom of the carrying pipe 125. The latter can be secured by means of the clamping means in several axially different positions relative to the supporting pipe 124. The mutual shiftability of the pipes 124 and 125 is indicated by the arrows 128.

A helical compression spring 129 is mounted in the space enclosed by the pipes 124 and 125, with its lower end bearing against the top of the pipe 121 and with its upper end against a lid 130 of the carrying pipe 125. The compression spring 129 tends to displace the pipe 125 upward relative to the pipe 124 and serves as a weight-relieving spring to facilitate the mutual displacement of the pipes 124 and 125 under the weight of the computer when the clamping means 126 is in an inoperative state. Between the lid 130 and the top of the tube 121 there is a stop in the form of a flexible cord 131 which in its stretched state has a length such that the pipe 125 cannot be slid off the pipe 124 by mistake; with the cord 131 in its stretched state, the pipe 125 overlaps the pipe 124 to such an extent that it can still be propped by the latter in a stable manner.

A part of the periphery of the carrying pipe 125 situated near its top is encircled by a tubular portion 132 of a holder or swivelling arm 133. This tubular portion 132 is, viewed axially with respect to the carrying pipe 125, fixed by means of a pin 134 placed tangentially relative to the portion 132 and to the carrying pipe 125. The pin 134 lies with part of its side facing the carrying pipe 125 in a circular groove 135 in the part of the carrying pipe lying inside the tube 132. The tubular portion 132 can therefore be rotated through an angle of 180° relative to the pipe 125, but cannot be shifted axially. A cylindrical portion 136 of the swivelling arm 133, integral with the tubular portion 132, projects sideways horizontally with respect to the tubes 124 and 125. The end of the cylindrical portion 136 opposite the pipe 125 turns into an upward pointing tubular portion 137 of the holder 133, spaced from the pipe 125.

The center line 138 of the cylindrical portion 136 intersects the center line of the two pipes 124 and 125, indicated by the reference number 139, at right angles. The center line 141 of the tubular portion 137 of the holder 133, provided with a bore 140, coincides with the center line of the bore 140 which is parallel to the center line 139 and intersects the center line 138 of the cylindrical portion 136 at right angles. The upper end of the portion 137 of the holder 133 is tubular and is upwardly open. This upper part encloses in a suitable manner the tubular bottom part of a clamping piece 142 which forms parts of a swivelling arm or carrying piece 143 of the support 102.

The clamping piece 142 is provided with a bore 144 which forms in the assembled state an extension of the bore 140 in the tubular portion 137. The clamping piece 142 of the carrying piece 143 is integral with a cylindrical portion 145 of the carrying piece 143 formed similar to the cylindrical portion 136 of the holder 133. The center line 146 of the cylindrical portion 145 intersects the center line 141 of the bores 140 and 144 at right angles.

The cylindrical portion 145 of the swivelling arm 143 turns on its side opposite to the clamping piece 142 into a bearing 147. The inner surface 148 of the bearing 147 is spherical and encloses part of a sphere larger than half a sphere. The inner surface 148 turns at its top into an upwardly diverging conical surface 149.

Figure 15:
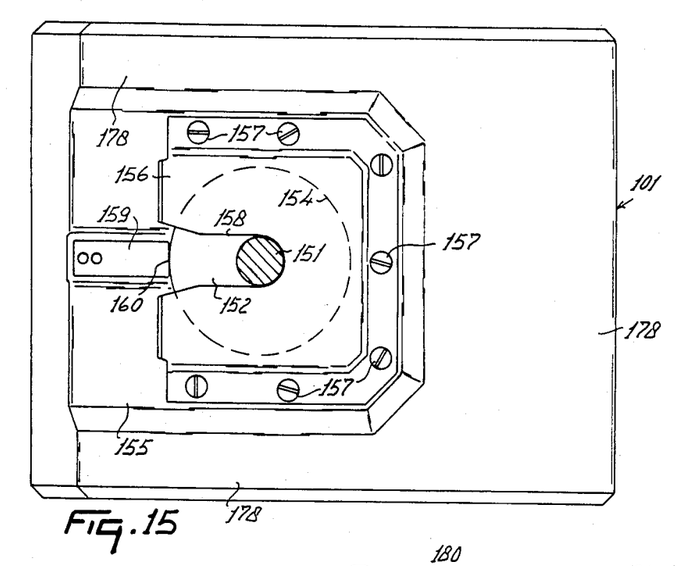
FIG. 15 is partially a cross-section and partially a view along line XV—XV in FIG. 14.

The inner surface 148 surrounds with a tight clearance a footstep 150 of steel or plastic in the form of the larger part of a sphere. The footstep 150 turns on top into a cylindrical rod 151, the diameter of which is such that, when the spherical footstep 150 swivels about its center, the rod 151 can swing over an angle of from about 10° to 20° from the vertical before its outer surface touches the conical surface 149 linearly. The rod 151 is integral not only with the footstep 150 but preferably also with a supporting plate 152 at the end of the rod 151 opposite the footstep. The supporting plate 152 extends in a direction at right angles to the center line 153 of the rod 151 and has a cylindrical outer surface 154 coaxial with the center line 153. The upper surface 154 of the supporting plate 152 opposite the footstep 150 abuts an upwardly curved portion 155 of the base plate 178 of the housing 104 of the computer 101 the supporting plate is enclosed on its side facing the keyboard 109 as well as on its edges contiguous with the latter side and over the greater parts of its base by a holder 156 in the form of a beaded plate, attached outside the periphery of the supported plate 152 by means of bolts 157 to the part 155 of the computer base plate 178. As regards the form of the holder 156, reference is also made to FIG. 15. As appears from the latter, the portion of the holder 156 lying at the base of the supporting plate 152 has a recess 158 in the part of the holder plate 156 lying in front of the rod 151 as viewed in the direction B. This recess has a width such that the rod 151 can be slid out of the holder 156 from the position shown in FIG. 15. However, in the arrangement shown in FIGS. 14 and 15 the rod 151 is prevented from sliding out of the holder in the direction B by a leaf spring 159 mounted, as viewed in the direction B, in front of the supporting plate 152 and abutting with its edge 160 against the outer surface 154 of the supporting plate 152. The spring 159 is rigidly fixed with its end distant from the edge 160 to the bottom side of the portion 155 of the base plate 178 of the computer housing 104. The portion 155 of the base plate lying directly above the spring 159 is recessed upward in such a manner that, when the spring 159 is bent against its resilience upward into this recess, it comes to lie entirely above the upper surface of the supporting plate 152 and the latter, together with the rod 151, the sphere 150 and the support 102, can be slid out of the holder 156 so that the computer 101 is detached from the support 102. The recessed portion 155 of the base plate 178 of the housing 104 is curved upward with respect to the remaining part of the base plate in such a manner, that the base of the holder 156 lies above the plane of this remaining part. This flat remaining part extends to the front of the computer and on both sides to the portion 155 so that the computer can rest on a table in a stable manner.

The bores 140 and 144 in the tubular portion 137 and in the clamping piece 142 respectively enclose a clamping means in the form of a rod 161 (FIG. 14). An annular pressure block 162, abutting against the bottom of the tubular portion 137, likewise encloses the rod 161 and has a cylindrical recess 163 in its lower part, through which the rod 161 protrudes downward from the pressure block 162. The rod 161 is provided at its lower end with a handle 164, rigidly connected with the rod. The uppermost end of the rod 161 lies in a recess 165 provided in the upper end of the clamping piece 142 and surrounding the center line 141. This uppermost end of the rod 161 is provided with a screw-thread. A nut 166 screwed onto this thread is narrowly enclosed by the boundary of the recess 165 so that it cannot turn with respect to the clamping piece 142.

A conical clamping piece 167, surrounding the rod 161, is placed inside the tubular portion 137 at the height of the center line 138 in the bore 140 and is loaded at its lower end by a compression spring 168 which abuts against a shoulder of the rod 161. A conical clamping piece 169 is placed at the height of the center line 146 and inside the bore 144 in an analogous manner and forced upward by a compression spring 170. This compression spring abuts with its lower end against another shoulder of the rod 161. Each of the two clamping pieces 167 and 169 has a conical outer surface converging upward. Both clamping pieces enclose the rod 161 with a narrow fit.

Bores 171 and 172 provided about the center lines 138 and 146 respectively emerge on the one hand in the bores 140 and 144 respectively and on the other hand in the outer circumference of the uppermost part of the carrying pipe 125 and the footstep 150 respectively. Each of the bores 171 and 172 contains a cylindrical sliding piece 173 and 174 respectively, fitting the corresponding bore and at one end fittingly abutting against the clamping pieces 167 and 169 respectively and at their other ends fittingly abutting against the outer circumference of the carrying pipe 125 and the footstep 150 respectively.

If the handle 164 is operated so that the rod 161 is screwed upward with respect to the nut 166, the clamping pieces 167 and 169 will be pushed upward via the compression springs 168 and 170 respectively. The axial sliding pieces 173 and 174 fittingly abut against the conical outer surfaces of the corresponding clamping pieces 167 and 169 respectively. If these clamping pieces are pushed upward by the rod 161 moving upward, the sliding pieces or fixing means 173 and 174 are forced toward the carrying pipe 125 and the footstep 150 respectively. The carrying pipe 125 as well as the footstep 150 is thus by a single action fixed by friction with respect to the holder 133 and the carrying piece 143 respectively. Owing to the force of reaction, the fixing means 173 and 174 press likewise against the clamping pieces 167 and 169 which are in their turn pressed against the rod 161 so that the swivelling arm 133 and 143 are fixed one with respect to the other. If the rod 161 is screwed downward with respect to the nut 166, both the lockings mentioned are released simultaneously. The presence of the springs 168 and 170 makes it unnecessary to position the clamping pieces 167 and 169 very accurately.

The swivelling arms 133 and 143 are rotatable about the center line 141 one with respect to the other. During the swivelling action the holder 133 and the carrying piece 143 remain in contact along a face between the two. A pin 175, lying in part in the uppermost tubular portion 137 of the holder 133 and in part in an annular groove 176 in the lowest tubular portion of the clamping piece 142 prevents the holder 133 from shifting axially with respect to the carrying piece 143 but permits mutual swivelling about the center line 141.

If, as described above, the rod 161 is screwed upward with respect to the nut 160, the clamping piece 142 is forced in a direction parallel to the center line 141 against the tubular portion 137 at the annular contact face 177 between these parts. The swivelling arms 133 and 143 are thereby likewise fixed one with respect to the other. The contact face 177 is preferably roughened.

It follows that by tightening or loosening the handle 164 not only is the swivelling arm 133 clamped with respect to the carrying pipe 125 and the swivelling arm 143 clamped with respect to the footstep 150, but also the holder 133 is clamped with respect to the carrying piece 143. The operation of the handle 164, in other words an axial shifting of the rod 161, thus results in a threefold action. With the rod 161 rotated so that it moves downward, the carrying piece 143 can be swivelled about the center line 141 with respect to the holder 133 as the contact pressure at the face 177 is reduced. The center lines 138 and 146 remain in parallel planes situated at right angles to the center line 141.

To sum up, when clamping means 126 is loosened, the carrying pipe 125 (and thereby the computer 101 mounted on the support 102) can be shifted up and down with respect to the supporting pipe 124. By operating the clamping means 161, 164, 167, 169, 173 and 174, with the rod 161 being screwed downward, it becomes possible:

1. to swing the swivelling arm 133 with respect to the carrying pipe 125 about the center line 139 (first hinge),
2. to swing the swivelling arm 143 with respect to the holder 133 about the center line 141 (second hinge),
3. to swing the footstep 150 and thereby the whole computer 101 with respect to the swivelling arm 143 (third pivot).

The three swivelling possibilities of the hinges are cancelled by operating the handle so that the rod 161 is screwed upward, the mutual positions being fixed in the desired manner by frictional forces.

In addition, with the leaf spring 159 moved upward the computer 101 can be slid out of the holder 146 in the direction B and thereby detached from the support 102.

The support 102 is dimensioned so that the carrying piece 143 and the holder 133 do not project beyond the periphery of the computer 101 in the positions of the support 102 most frequently considered. The computer 101 can be moved to its most extreme position with respect to the tube 121 by swinging the swivelling arm 143 from the position shown in FIG. 14 about the center line 141 over an angle of 180° with respect to the swivelling arm 133.

The support 102 thus offers a universal possibility of adjustment of the computer 101 with respect to the tube 121; these possibilities are of importance especially when the computer is installed in the restricted space of a vehicle, so that all possibilities are present to adjust the position of the keyboard 109 and the screen 107 to the position of the operator (who sits in the driver's seat or in another place in the vehicle).

The hinges of the support 102 and the shiftability 124, 125 offer four degrees of freedom for this purpose, and by the presence of the spherical bearing 147, 150 essentially more than four degrees of freedom.

The support 102 is made at least in part of a flexible plastic. Especially the swivelling arms 133 and 143 can be made of a resilient, tough type of synthetic resin so that the computer will be less subject to acceleration peaks caused by shocks or vibrations of the vehicle.

Besides installing the computer in the vehicle by means of the support 102, it remains possible to use it on a table in an industrial plant or in an office. In this connection it should be noted that the upwardly curved portion 155 of the base plate of the computer housing 104 occupies only a restricted part of the base plate indicated by reference number 178. As appears from FIG. 15, the flat part of the base plate 178, by which the computer can be supported on a table, extends not only over the portion underneath the keyboard 109, but also to both sides of the holder 156 up to the back of the computer 101; the base of the holder 156 lies at a short distance above the base of the base plate 178.

As a possibly disturbing effect of light incident on the screen 107 can play a considerable part when the computer is used in vehicles, the picture screen is positioned in this embodiment tilted downward and forward with respect to its upper edge by an angle of about 20° and lies, viewed in the direction B (FIG. 12), in front of a protruding edge 179 of the housing 104. Viewed in the vertical direction, the screen 107 lies nearly right above the keyboard 109. The protruding edge 179 lies nearly right above the edge of the keyboard 109 facing the user.

The computer 101 can be mounted with a preferably built-in printer for recording the data obtained in the vehicle and entered in the computer. These data can be obtained by means of sensors still to be described.

As an undesirable excessive heating of the computer can be caused by incident sun light while the computer is used in the field or in a vehicle, it is suggested that the computer housing, in particular the upper wall of the computer, be provided with an insulating layer mounted on the impact-resistant housing of synthetic resin. However, this insulating layer can also be mounted on the side walls and the rear wall. Such an insulating layer is of importance especially because the temperature to which the electronic components may be subjected is limited.

Parts of the housing 104 are preferably likewise provided with a resilient layer, mounted in particular on the edges of the housing and also around the handle 106. As the computer is operated in a vehicle in a restricted space, the change that the operator or another person knocks against it is relatively great, to the detriment of both the computer and the person. In this connection it should be noted that, with a right choice of material, the afore-mentioned insulating layer and the resilient layer can be combined in a single type of material. Reference is made here to known foam plastics used in particular as base layers for roof coverings and combining both properties.

Figure 16:
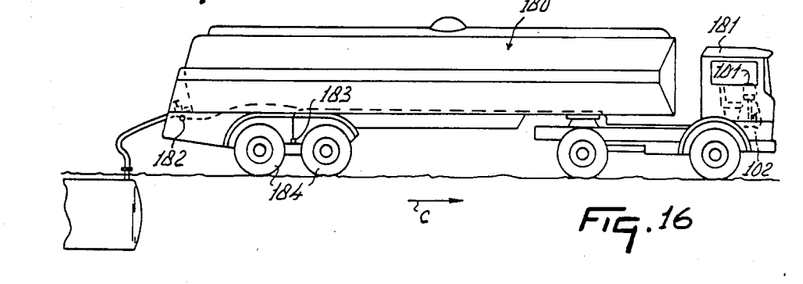
FIG. 16 indicates in a side view an application in a tank truck.
Figure 17:
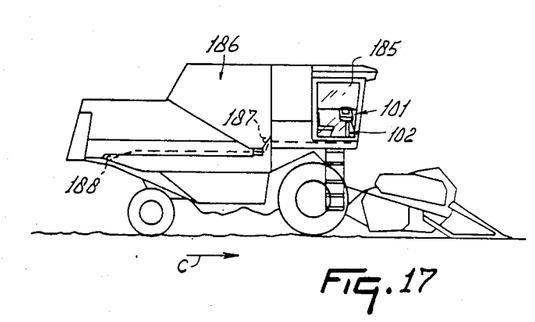
FIG. 17 indicates in a side view an application in a combine harvester.

An application of the computer mounted on the support 102 in the cab of a truck is shown in FIG. 16 for a tank-truck 180 delivering or fetching liquids, the computer being installed in the cab 181 of the truck. A sensor 182 for measuring the quantity of liquid passed per unit time or the total quantity of liquid passed can in this case be placed near the discharge opening of the tank, but a sensor 183 can also be considered for recording the changing weight of the tank with content as loading the rear wheesl 184. The sensor 182 and/or 183 is connected to the computer enabling the driver to ascertain by means of the screen 107 or the printer the in-flowing or out-flowing quantities or weights of the load. The print-out can serve as proof of delivery and as bookkeeping voucher; however, the data are also retained in the computer memory at the disposal of the cartage contractor's accountancy. As a matter of course, this method of use is also applicable to trucks with variable load. In case the computer 101 is installed by means of the support 102 in the cab 185 of a combine harvester 186 (FIG. 17), the weight of the grain in the storage space can be measured by means of a sensor 187, but the losses of grain near the end of the tractor can also be measured by means of a sensor 188 and registered in the computer in order to determine the efficiency of the thrashing process.

Figures 18, 19:
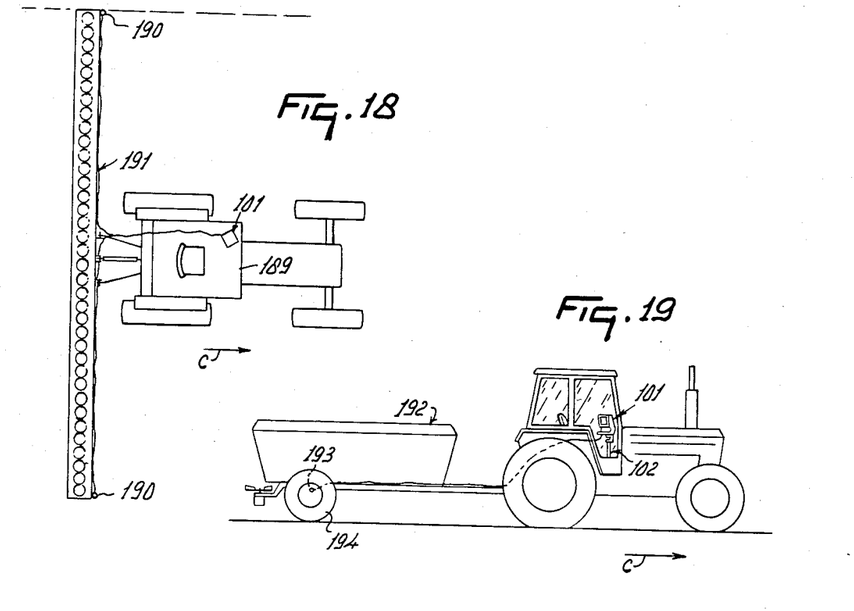
FIG. 18 indicates in a top view an application in an agricultural tractor.
FIG. 19 indicates in a side view an application in the case of a fertilizer distributor drawn by a tractor and FIG. 20 indicates in a side view an application in a truck.

If the computer 101 is installed by means of its support 102 in the cab of an agricultural tractor (FIG. 18), a sensor 190 can be placed near each transverse end of a soil working implement, in this case a harrow with tooth-like tools rotating about vertical axes. Such sensors 190 in the form of known soil humidity detectors can be used with advantage in this case. The sensors 190 are mounted near the front—as viewed in the direction of travel C—of the soil-working implement. While harrowing in the direction of travel C, the sensors 190 are in contact with the soil not harrowed as yet and having at its surface a humidity lower than the directly adjacent strip of soil already harrowed. By driving the tractor so that one of the sensor 190 registers and shows on the screen of the computer 101 as far as possible alternately a lower or higher humidity, the driver can steer accurately along the strip of soil previously harrowed.

In case a fertilizer distributer 192 is coupled to an agricultural tractor (FIG. 19), one or several sensors 193 can be installed in a place where the weight of the fertilizer container rests on the wheels 194 of the distributor. In this manner the sensor 193 measures continuously the reduction of weight in the container and thereby the quantity of fertilizer distribted. These data can be entered in the computer and form part of the seed-bed preparation lost. These cost can be worked out after return by detaching the computer 101 from the support 102 and placing it on a table in an office for further calculations.

Figure 20:
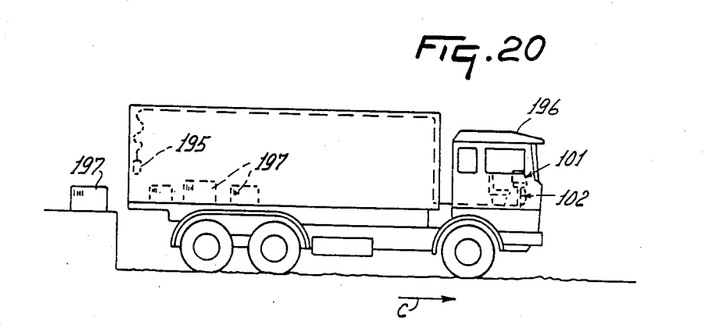

In the application according to FIG. 20, an optical reading device 195 is placed near the unloading opening of a truck, the computer 101 mounted on the support 102 being installed in the cab 196 of the truck. When loading or unloading objects such as crates or boxes 197, the device 195 can count the number of boxes loaded or unloaded. The optical reading device can also detect the data of a stripcode on the objects 197, whereby the nature of the freight being handled can be entered in the computer. The computer 101 can be detached from the support 102 after return, and the data entered can then be worked out, e.g., likewise for costing purposes or for loading checks, on a table placed in an office.

The foregoing description is for clearness of understanding and no unnecessary limitations should be concluded therefrom for modifications and equivalents will be obvious to those skilled in the art in view thereof without departing from the spirit of the inventive concepts as set forth in the following claims.

Having disclosed my invention, what I claim as new and to be secured by Letters Patent of the United States is:

1. A computer of a type and size that is easily portable and transportable by a person of normal physique which comprises at least one computer housing having an integral keyboard, said housing including a base which is constructed and arranged so that the computer can be used while supported in transportation means by said base and alternatively while removed from said base and resting on a table remote from said transportation means, and a computer input device having a spherically shaped input control member mounted in said housing so as to be universally turnable in said housing.

2. A computer according to claim 1 wherein said input member is attached to a side wall of said housing.

3. A computer according to claim 1 comprising sensors controlling the computer fitted relative to said input member so as to be responsive thereto, said input member being movable with respect to said sensors.

4. A computer according to claim 3 comprising a push-button which is mounted to cooperate with said input member so that information generated by said input member can be stored in the computer's memory.

5. A computer according to claim 1 wherein said input device comprises a lever attached to said control member which is moved by said lever.

6. A computer according to claim 5 comprising a push-button for entering instructions in the computer attached to said lever.

7. A computer according to claim 1 wherein, said input member is mounted near said keyboard.

8. A computer according to claim 1 in combination with a support which is adapted to receive said computer housing for mounting the computer in a vehicle, said support being readily removably mounted in said vehicle.

9. A computer according to claim 1 comprising handle means for enabling said person to lift and carry the computer.

10. A computer of a type that is portable and easily transportable by a person of ordinary physique which comprises at least one computer housing, said housing comprising a base which is adapted selectively for being mounted on support means affixed to a vehicle or to rest on a table top remote from the vehicle, and a connection for at least one sensor in combination with said one sensor which is connected to the computer via said connection, said sensor being disposed in a loading space associated with a vehicle and comprising a measuring device which is adapted to ascertain the weight of a load carried in said space by determining the weight carried by a wheel axle.

11. A computer according to claim 10 wherein said measuring device continually measures said load as it is loaded or unloaded into or from said space.

12. A computer of a type which is portable and easily transportable by a person or normal physique comprising a housing which is constructed so that the computer can be operated while supported on a table and can also be mounted with facility in the cab of a vehicle, handle means for enabling said person to lift and carry the computer, a screen, a keyboard for operating the computer, said keyboard being attached in said housing lower than the screen and at least partly behind a plane extending upwardly through said screen and substantially coinciding throughout with the general plane of said screen.

13. A computer according to claim 12 comprising an adjustable cap attached to said housing near said screen by hinge means, said cap being hingedly attached to said housing so that it can be swivelled about an axis defined by said hinge means, said axis proximate to and substantially under said screen.

14. A computer according to claim 13 comprising a recess for said handle means in the upper side of said housing, said recess centered in said upper side and located to the rear of said cap.

15. A computer according to claim 13 comprising a recess centered as seen in side elevation in the upper side of said housing and to the rear of said cap.

16. A computer according to claim 12 combined with mounting means for mounting it in the cab of an agricultural tractor.

17. A computer comprising a housing which is constructed so that the computer can be operated while supported on a table in a first operating condition, said housing also including mounting means for being securely mounted in a vehicle remote from and movable relative to the table for a second operating condition, said computer comprising connections for sensing operations associated with said vehicle in said second operating condition and for collecting and storing input data therefrom, and said computer comprising means for computing statistical results and for performing business calculations in said first operating condition based at least in part on said sensed operations and collected data of said second operating condition.

18. A computer according to claim 17 comprising connection means affixed to said vehicle, said mounting means readily removably fastened to said connection means.

19. A computer which is readily transportable by persons of normal strength and physique and which is intended to be received in a mobile platform having fastening means therefor and data communication means for transmitting and receiving data such as from and to equipment attached to said mobile platform, the computer comprising a housing, a screen affixed to said housing, a keyboard for introducing data into the computer, readily detachable means on said housing which is adapted securely to attach the computer to said fastening means, a base on said housing for optionally supporting the computer on a stationary platform apart from said mobile platform, and connections for detachably connecting the computer to said data transmission means when the computer is received in said mobile platform, the computer further comprising memory means for collecting and storing data from said data communication means when the computer is received in said mobile platform and calculating means for making computations based on said data when the computer is on said stationary platform.

20. A computer according to claim 19 which comprises a manually operated input control member mounted on said housing.

21. A computer according to claim 20 wherein said input control member comprises a sphere which is universally turnable in said housing.

22. A computer according to claim 19 wherein said control member comprises a joystick and a push-button for selectively permitting the computer to receive data from the operation from said joystick.

23. A computer according to claim 22 wherein said joystick comprises a spherical part received in said housing.

24. A computer according to claim 19 wherein said keyboard is under said screen as seen in side elevation and said control member is proximate said keyboard.

25. A computer according to claim 19 wherein said screen is disposed in said housing relative to the horizontal so as to be slanted inwardly from top to bottom so as to avoid light being reflected via said screen into the eyes of the operator of the computer that obscures said operator's view of information displayed on said screen.

* * * * *